(12) United States Patent
Archier et al.

(10) Patent No.: US 11,243,163 B2
(45) Date of Patent: Feb. 8, 2022

(54) SYSTEM FOR CAPTURING POINT VALUES FOR CONSTITUTING AN IMAGE WITH TERAHERTZ RADIATION

(71) Applicant: TERAKALIS, Montpellier (FR)

(72) Inventors: Christophe Archier, Montpellier (FR); Benoit Moulin, Montpellier (FR)

( * ) Notice: Subject to any disclaimer, the term of this patent is extended or adjusted under 35 U.S.C. 154(b) by 0 days.

(21) Appl. No.: 16/633,590

(22) PCT Filed: Jul. 24, 2018

(86) PCT No.: PCT/FR2018/051894
§ 371 (c)(1),
(2) Date: Feb. 12, 2020

(87) PCT Pub. No.: WO2019/020928
PCT Pub. Date: Jan. 31, 2019

(65) Prior Publication Data
US 2020/0271576 A1 Aug. 27, 2020

(30) Foreign Application Priority Data
Jul. 24, 2017 (FR) ...................................... 1756999

(51) Int. Cl.
*G01N 21/3581* (2014.01)
*G02B 3/04* (2006.01)

(52) U.S. Cl.
CPC ........... *G01N 21/3581* (2013.01); *G02B 3/04* (2013.01)

(58) Field of Classification Search
CPC .............................. G01N 21/3581; G02B 3/04
See application file for complete search history.

(56) References Cited

U.S. PATENT DOCUMENTS 5,789,750 A 8/1998 Nuss
6,815,683 B2 11/2004 Federici et al.
(Continued)

OTHER PUBLICATIONS

ISR; European Patent Office; NL; Oct. 31, 2018.
(Continued)

*Primary Examiner* — Hugh Maupin
(74) *Attorney, Agent, or Firm* — Patshegen IP LLC; Moshe Pinchas

(57) ABSTRACT

The device (40) for capturing point values for constituting an image, comprises:
an incoherent source (100) of rays, the frequency of which is between 0.075 THz and 10 THz for illuminating an object,
a sensor (415) of radiation coming from the object, which comprises an area sensitive to the radiation coming from the source and which emits an electrical signal representative of the intensity of the rays coming from the source and reaching the sensitive area of the sensor, and
at least one optical focusing system (400, 410) with aperture number (F-Number) less than one, situated on the optical path of rays emitted by the source and propagating from the source to the sensor of rays, passing via the object.

Preferably, the source (100) illuminates the object with a sufficiently broad emission spectrum to scan the standing wave in a period shorter than the acquisition time of the sensor.

Preferably, the incoherent source has a bandwidth of several GHz, preferably at least equal to 12 GHz at −100 dB.

19 Claims, 9 Drawing Sheets

(56) References Cited

U.S. PATENT DOCUMENTS

| | | | |
|---|---|---|---|
| 2004/0065831 A1* | 4/2004 | Federici | G01N 21/3581 250/341.1 |
| 2008/0251720 A1* | 10/2008 | Xu | G01B 15/04 250/332 |
| 2011/0168891 A1 | 7/2011 | Van Der Weide et al. | |
| 2015/0036038 A1* | 2/2015 | Horstmeyer | G01N 23/205 348/342 |
| 2017/0234807 A1* | 8/2017 | Oyama | G01N 21/3581 250/338.1 |
| 2017/0293046 A1* | 10/2017 | Tzuang | G01V 8/005 |

OTHER PUBLICATIONS

Chernomyrdin Nikita V et al; "Wide-Aperture Aspherical Lens for High-Resolution Terahertz Imaging"; Review of Scientific Instruments; Jan. 12, 2017.

Woo Jeong Min et al: "Terahertz Filter Integrated With a Subwavelength Structured Antireflection Coating", Jan. 1, 1901.

Piotr Garbacz: "Terahertz Imaging-Principles, Techniques, Benefits and Limitations" Jan. 1, 2016.

Valk Van Der N C J et al: "Terahertz Polarization Imaging," Oct. 15, 2005.

* cited by examiner

SYSTEM FOR CAPTURING POINT VALUES FOR CONSTITUTING AN IMAGE WITH TERAHERTZ RADIATION

TECHNICAL FIELD

The present invention relates to a system for capturing point values for constituting an image with terahertz radiation. It concerns, in particular, the field of imaging, for example for the quality control of manufactured parts.

STATE OF THE ART

The terahertz (THz) region refers to electromagnetic waves with a frequency between 0.075 THz and 10 THz, or, in terms of wavelength, from 4 mm to 30 µm. Referred to as millimetric waves, they are situated between the far infrared (FIR) and radar waves (microwaves). The invention relates more specifically to the range 75-700 GHz. In this frequency range, a large portion of non-conductive composites and plastic materials are transparent to the radiation. And the radiation sources are relatively affordable in terms of the ratio of the price of the sources to the optical power available.

All the optical principles used in designing visible or infrared systems apply to THz radiation with the same ratio of the proportion of phenomena relative to the wavelength. For example, the diffraction limit is given by the Airy function Rdiff=1.22$\lambda$ F/#, where $\lambda$ is the wavelength and F/# the aperture number (also referred to as the f-number). Thus, for an f-number F/# of 2, and a wavelength of 1 mm, there is a diffraction limit of 2.44 mm. This millimetric diffraction limit corresponds to the average spatial resolution of a THz imaging system.

However, the known systems do not reach this resolution, which would allow optimum performance levels to be achieved.

The existing THz systems use off-axis parabolic mirrors as the means for propagating the beam. This is because, in many applications, the power level of the source is so low that the losses introduced by each lens are not acceptable (losses by absorption, and above all losses by reflection at the interfaces).

However, the use of these mirrors poses many problems:
difficulty of alignment, with many angles;
very high price of the lens units;
restricted focal length range, especially at high apertures; and
obligation to work on a flat wavefront and on the optical axis.

In addition, a THz beam is invisible to the naked eye and, unlike the near infrared, there is no photosensitive card allowing the radiation to be converted to wavelengths visible to the naked eye. This aspect has an impact on the setting and alignment of systems.

Below is a description of the types of available sources in the THz region. There are several methods of generating continuous THz radiation which can be used in a device that is the subject of the invention, for example:
Gunn diode, combined with a frequency multiplier to go beyond 0.2 THz, for example 2 THz;
IMPATT diode, combined with a frequency multiplier to go beyond 0.2 THz;
Fixed or variable oscillator between 0 and 0.02 THz, combined with a frequency multiplier;
Frequency conversion via the beating of two near-infrared lasers;
HV tube known as a BWO (acronym for backward-wave oscillator);
Gas cavity excitation by a far infrared laser; or
Quantum cascade laser (QCL).

The document by Nikita Chernomyrdin et al. is known: "Wide-aperture aspherical lens for high-resolution terahertz imaging" (Review of Scientific Instruments, AIP, Melville, N.Y., US, vol. 88, no. 1, Jan. 12, 2017, XP012215296, ISSN: 0034-6748, DOI: 10.1063/1.4973764).

In this document, the signal generated by the sources normally used in the THz region has a very pure coherence and the emission line width is very small. This coherent radiation is not favorable to image formation because interference fringes are generated with a very large amplitude on each system where this is permitted. Typically, these sources have a precision of 0.001 Hz with a bandwidth of 1 kHz at −118 dBc/Hz.

Using a coherent source in an imaging system when the scene to be observed is not perpendicular at every point in the field generates an amplitude modulation proportional to the modulo 214 altitude changes. Which is detrimental to the quality of the image formed.

DESCRIPTION OF THE INVENTION

The present invention aims to remedy all or part of these drawbacks.

To this end, according to a first aspect, the present invention envisages a device capturing point values for constituting an image, which comprises:
an incoherent source of rays, the frequency of which is between 0.075 THz and 10 THz for illuminating an object;
a sensor of radiation coming from the object, which comprises an area sensitive to the radiation coming from the source and which emits an electrical signal representative of the intensity of the rays coming from the source and reaching the sensitive area of the sensor; and
at least one optical focusing system with aperture number (f-number) less than one, situated on the optical path of rays emitted by the source and propagating from the source to the sensor of rays, passing via the object.

Thanks to these provisions, the imaging device is not subject to the presence of standing waves due to the incoherence of the source. The inventor has determined that this combination of optical and electronic means enables accurate point measurements to be made, the relative movement of these means and the object making it possible to produce linear or raster images.

The source used has a bandwidth of several GHz, preferably:
between 100 and 200 GHz, the bandwidth is 12 GHz at −100 dB;
between 220 and 320 GHz, the bandwidth is 15 GHz at −100 dB;
between 560 and 640 GHz, the bandwidth is 15 GHz at −100 dB.

In some embodiments, the source illuminates the object with a sufficiently broad emission spectrum to scan the standing wave in a period shorter than the sensor's acquisition time.

In some embodiments, at least one optical system comprises an aspheric optical lens.

In some embodiments, the scattering (as a percentage) for the indices of the materials used over the frequency ranges of the source is less than 1%.

For example, the scattering in HDPE (high-density polyethylene) is of the order of 0.5% over the frequency range and, more specifically:

0.2%, from 100 to 300 GHz; and 0.5%, from 100 to 700 GHz.

The aspheric lens simplifies the optical design, compared to the use of parabolic mirrors.

In some embodiments, at least one optical component of an optical system has an anti-reflective treatment comprising microstructures in the form of cones or craters.

The advantage of this method is that it makes it possible to realize anti-reflective treatments with a very large bandwidth and low sensitivity to the orientation of the surface.

In some embodiments, at least one optical system comprises an optical lens and the incoherent source of rays is configured to illuminate the whole of the optical lens closest to said source.

In some embodiments, the emission frequency of the incoherent source is modulated.

In some embodiments, the incoherent source comprises a source of thermal-type noise in an IMPATT diode or resistor.

In some embodiments, the device comprises proximity electronics to polarize a nano-transistor comprising the photosensitive area, via a gate voltage close to its swing voltage where the standard operation of the transistor is the most nonlinear.

In some embodiments, the rectified signal coming from the nano-transistor is amplified by forcing an asymmetry of the loads in the nano-transistor channel through the injection of a current into the transistor channel, between the drain and the source and/or by using metalized motifs acting as antennas.

In some embodiments, the rectified signal is a continuous potential difference between the Drain and the Source of the nano-transistor measured in common or differential mode.

In some embodiments, the proximity electronics comprises a compensation circuit to adjust for the offset generated by injecting the current between the drain and the source, for example by using a subtractor assembly.

In some embodiments, the photosensitive area is a nano-transistor, and the signal generated by the THz radiation is a continuous potential difference between the Drain and the Source of the nano-transistor measured in common or differential mode.

In some embodiments, the device comprises proximity electronics to polarize the nano-transistor via a gate voltage close to its swing voltage where the standard operation of the transistor is the most nonlinear.

In some embodiments, the rectified signal coming from the nano-transistor is amplified by forcing an asymmetry of the loads in the nano-transistor channel through the injection of a current into the transistor channel, between the drain and the source and/or by using metalized motifs acting as antennas.

In this way, the sensitivity of the device is increased.

In some embodiments, the device comprises at least one low-drift low-noise amplifier, which amplifies the signal over the dynamics of an analog-digital converter.

In some embodiments, the device comprises a means for synchronizing the demodulation of the signal with the amplitude modulation signal of the source.

This ensures a maximum signal-to-noise ratio by eliminating all the additive noises with a frequency other than the modulation frequency of the source.

In some embodiments, the device comprises a means for synchronizing the digital output of the device with the THz source.

The sensor and the source are synchronized via a digital clock signal. The source is amplitude modulated via this clock signal, which makes it possible to measure and compensate for the residual signal (offset) present at the sensor's terminals when THz is absent. The compensation is both digital, via a high-frequency subtraction of the signal measured with THz and without THz, and analog, by adjusting the voltage to be subtracted from the sensor's signal in order to maintain the overall level within a specific voltage range.

This architecture ensures greater sensitivity and an improved signal-to-noise ratio.

In some embodiments, the device comprises an encoder of the absolute positions of the object to be imaged, these measured position data being synchronized with the data coming from the sensor for use over the entire course of the object's movement, including in the acceleration areas, and for exploitation of the outward and return movement of the object, by means of the setting of the odd and even lines avoiding a shear phenomenon.

Averaging the data established on the absolute positions and not on the time enables adaptation to all speeds of movement.

In some embodiments, the device that is the subject of the invention comprises a beam splitter, the incident polarization on the beam splitter being TM mode (acronym for transverse mode) polarization, in which the field is parallel to the plane of incidence.

The beam splitter is, for example, a blade made of HRFZ-Si whose thickness is calculated to ensure optimum separation. Thanks to these provisions, reflectometry measurements can be taken. TM mode polarization ensures better stability of the separation efficiency when the thickness of the beam splitter varies in its manufacturing tolerance.

In some embodiments, the device comprises a means for measuring the intensity of the radiation coming from the object, and/or polarization of the rays coming from the object, and/or the path difference of the rays coming from the object.

The device that is the subject of the invention therefore enables several types of measurements.

BRIEF DESCRIPTION OF THE FIGURES

Other advantages, aims and characteristics of the present invention will become apparent from the description that will follow, made as an example that is in no way limiting, with reference to the drawings included in an appendix, in which.

DESCRIPTION OF EMBODIMENTS OF THE INVENTION

It is now noted that the figures are not to scale.

In the image capture systems that are the subjects of the invention, refractive optics (lenses) are utilized, which have greater modularity than mirrors, and give access to the use of powerful computer-aided optical design tools.

In the 100-700 GHz region of frequencies, the preferred region of use of the present invention, the indices of the materials (high-density polyethylene (HDPE), polymethylpentene (PMP), polycarbonate (PC), HRFZ silicon (Si)) are constant within a few percentage points, or even less, as described above, for HDPE. The systems that are the subjects of the invention therefore present no chromaticity problem, i.e. there is no modification in the optical behavior of the diopters when the wavelength changes.

Preferably, the image device that is the subject of the invention utilizes an incoherent terahertz (THz) source 100.

Figure 1:
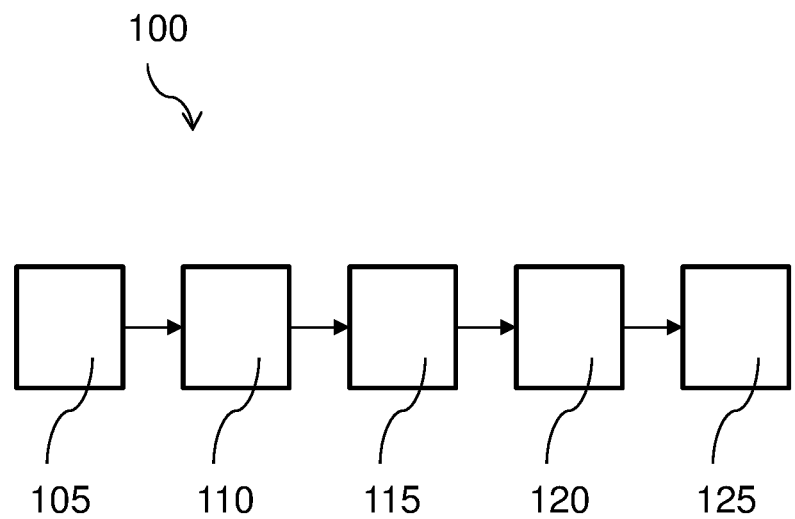
FIG. 1 represents, schematically and in cross-section, a first example of realization of an incoherent terahertz source.

According to a first example, an incoherent THz source 100 comprises, as shown in FIG. 1:
- a broadband terahertz emitter 105 (f<200 GHz) (0.1 GHz<Δf<40 GHz);
- a filter 110 for limiting the emission band;
- amplifiers or attenuators 115;
- frequency multipliers 120; and
- an emitting antenna 125.

Figure 2:
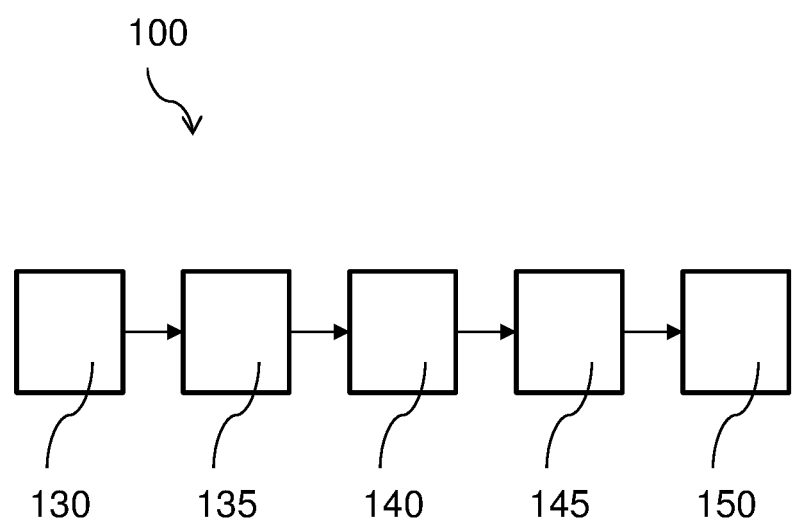
FIG. 2 represents, schematically and in cross-section, a second example of realization of an incoherent terahertz source.

According to a second example, an incoherent THz source 100 comprises, as shown in FIG. 2:
- a low-band emitter 130, i.e. in a frequency range from 0.1 GHz to 40 GHz, emitting in a narrow band (f<1 GHz);
- a modulator 135 over a band of 0.1 GHz<Δf<40 GHz;
- amplifiers or attenuator 140;
- frequency multipliers 145; and
- an emitting antenna 150.

The emitter 110 or 130 generates an incoherent signal such that, in a period shorter than the sensor's acquisition time, the emitter emits a sufficiently broad emission spectrum for scanning the standing wave.

The source used has a bandwidth of several GHz, preferably:
- between 100 and 200 GHz, the bandwidth is 12 GHz at −100 dB;
- between 220 and 320 GHz, the bandwidth is 15 GHz at −100 dB;
- between 560 and 640 GHz, the bandwidth is 15 GHz at −100 dB.

In some embodiments, the emitter 110 or 130 is a source of thermal-type noise in an IMPATT diode or resistor.

In some embodiments, the emitter 110 or 130 is a tunable source such as a variable-frequency oscillator or JIG.

The modulator 135 is tuned so that, once multiplied by each frequency multiplier 145, the generated signal's emission bandwidth is preferably in the range 0.1 GHz<Δf<10 GHz. It is noted that the modulator 135 is modulable over a very narrow band (for example 200 MHz).

The amplifiers 115, 140 or attenuators are used to adjust the input power of the signal before each frequency multiplier 120 or 145. The multipliers, amplifiers and attenuators can use structures that are on a PCB (acronym for printed circuit board) or are properly guided (at the frequencies considered, these electromagnetic waves confined in metallic waveguides can be manipulated).

The choice of antenna 125 or 150 makes it possible to parameterize the optical properties of the beam exiting from the last multiplier 120 or 145: polarization, TEM mode (transverse electromagnetic mode), divergence and size of the emission point.

The source presented in FIGS. 1 and 2 uses an emission spectrum that provides a scan at least equal to λ/4, which means the sensitivity to standing waves in the image can be reduced while making it possible to choose the working frequency and polarization.

With regard to the imaging optics, the spatial resolution is linked to the dimension of the smallest spot that can be focused through the system. The radius of the spot is given by the Airy function Rdiff=1.22λ F/#, where λ is the wavelength and F/# the f-number.

The spatial resolution is therefore proportional to the wavelength λ, and to the f-number F/# used in the focusing system. This f-number F/# is calculated using the diameter D of the focusing optics and the focal length f of said optics: F/#=f/D.

For a fixed wavelength λ, the resolution of the system can therefore be optimized by choosing a larger diameter D of the optics, or a shorter focal length f of the optics.

The f-number F/# is physically limited to a value of 0.5, but in practice with realistic optical indices (a value of 1.5 for example), it is very difficult to obtain f-numbers below 0.7.

To maximize the diameter D of the beam, the divergence of the source is taken into account in order to choose the focal length f of the first lens such that the beam completely fills this first lens. As a result, the diameter D of the beam is equal to the diameter of the first lens, and the f-number parameter F/# is thus optimized.

Preferably, the imaging device that is the subject of the invention uses aspheric lenses (FIGS. 3 to 6 and 13 to 15).

It is noted here that a spherical lens is a lens in which the shape of each surface follows the shape of a sphere. When spherical lenses with large diameters are used, an aberration linked to the curvature of the lens, known as "spherical aberration", appears. The edge rays (passing near the edge of the lens) are not focused in the same place as the paraxial rays (passing through the center of the lens). This effect counteracts the gain in resolution through increasing the diameter of the beam, because the focused beam with spherical aberration no longer follows the Airy function described above. In addition, the introduction of this spherical aberration disrupts the entire propagation of the THz beam, creating rings of light instead of one circular focus point (spot): there is loss of energy as well as loss of information.

There are several solutions to resolve this phenomenon, the simplest being to use what are known as aspheric lenses. In an aspheric lens, the shape of the curvature follows that of a sphere at the center, but outside the center the curvature is adjusted so as to eliminate the spherical aberration. In visible and infrared optics, these lenses are very expensive to manufacture because of their complex shape.

In THz, given the production methods used, it is just as easy to manufacture a spherical lens as an aspheric lens.

3D printing and/or micro-machining is used, with a residual roughness between 0.02 and 0.1 mm. Measuring the propagation parameters of the source makes it possible to define the input illumination of the system: divergence, distribution of the energy.

In some embodiments, the scattering (as a percentage) for the indices of the materials used for the lens, over the frequency ranges of the source, is less than 1%.

For example, the scattering in HDPE is of the order of 0.5% over the frequency range and, more specifically:

0.2%, from 100 to 300 GHz; and
0.5%, from 100 to 700 GHz.

The system is optimized by varying the distances between the optics, the radii of curvature of the surfaces, and the conicity coefficients (hence the asphericity).

The criterion for the optimization of the system can be set, for example, to minimize the size of the spot at several points of the field, or to minimize the wavefront difference at several points of the field.

Since the wavelength of the beam is millimetric, a roughness of $1/100$ is sufficient to ensure good transmission efficiency. This roughness is compatible with the microcutters used on modern lathes and milling machines, and in 3D printing by wire deposition.

In the design of the imaging device, all the lenses are therefore designed as aspheric in order to obtain maximum optical performance in terms of spherical aberration and to limit the number of lenses used.

In the case of devices for point imaging, the focusing lenses are designed to work in flat wavefront mode, i.e. the incident beam must be collimated (parallel rays) and its diameter must be the same as the active diameter of the lens. On exit from the focusing lens, the focal point is defined where the beam is the smallest, then the beam diverges again and is then captured by another lens.

Thanks to the use of focusing lenses with high f-numbers, images are produced with the highest spatial resolution allowed by physical laws, with a view of details having dimensions smaller than the wavelength used.

With regard to the anti-reflective treatments of the lenses and, where appropriate, of the beam splitter, their structure consists of a surface structure on the refractive optics that has the effect of reducing the reflection of each diopter by acting on the optical index at the surface of the lens.

A first method consists of depositing one or more layers of dielectric material with a lower optical index than that of the treated lens, for example the optical index of the treatment material is close to the square root of the optical index of the lens. The thickness of the layer to be deposited is of the order of a quarter of the average wavelength used. This thickness of the treatment material is relatively large in THz, compared to the infrared, which poses problems for the deposition technique.

A second method, used preferably in the imaging device that is the subject of the invention, consists of forming microstructures in the form of cones or craters using a method of micro-machining, for example laser drilling using a femtosecond laser. These microstructures with dimensions smaller than the wavelength create an apparent index gradient at the surface of the diopters that annuls the reflection on the surface since there is no longer the index discontinuity that causes the reflection. The advantage of this method is that it makes it possible to realize anti-reflective treatments with a very large bandwidth and less sensitivity to the orientation of the surface, unlike the layer deposition method.

Figure 16:
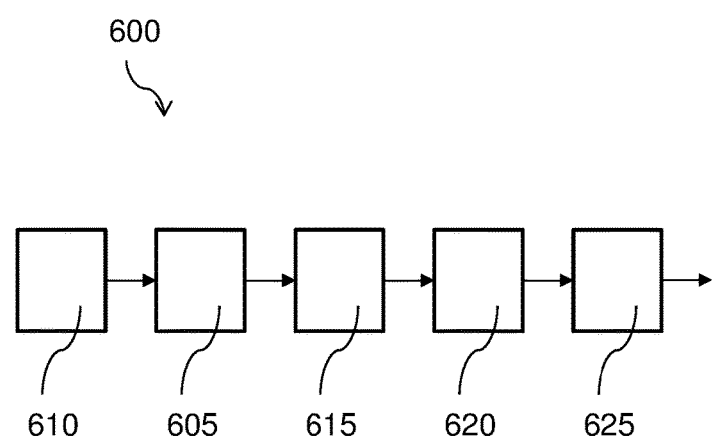
FIG. 16 represents, schematically, a point sensor.

Using this type of treatment increases the energy yield of optical systems with several lenses by increasing the transmission of each optical diopter. Thanks to the anti-reflective treatments, the energy projected onto the sensor is increased by several tens of percent. The anti-reflective treatments also play a role in eliminating ghost images and standing waves.

Where a point sensor 600 is used in the imaging device of the invention, its structure comprises, as shown in FIG. 16:

a THz detector 605. The THz detector is a GAAS, GAN or INP RF nano-transistor using a technology of less than 0.25 μm which, by a plasma effect in its channel, rectifies the THz waves in the bands 0.1 THz to 2.5 THz;

proximity electronics 610 for polarizing the detector. To be an effective rectifier, the nano-transistor has to be polarized via a gate voltage close to its swing voltage where the standard operation of the transistor is the most nonlinear. The rectified signal is amplified by forcing an asymmetry of the loads in the channel through the injection of a current into the transistor channel between the drain and the source, which has the effect of increasing the sensitivity of the transistor;

proximity electronics 615 for shaping the THz signal. The rectified signal is a continuous potential difference between the Drain and the Source of the nano-transistor measured in common or differential mode. The proximity electronics 615 are high impedance so as to not attenuate the amplitude of the signal and to force the polarization current to be injected into the transistor and not into the amplification circuit. A subtractor assembly compensates for the offset generated by injecting the current between the drain and the source. One or more low-drift low-noise amplifiers amplify the signal over the dynamics of the Analog-Digital Converter (ADC) 620;

electronics 620 for digitizing the signal. The analog-digital converter has significant dynamics in amplitude (>12 bits) and is rapid (>100 thousand samples per second);

a central processing unit 625 utilizing a signal demodulation algorithm. In order to limit the LF and HF noises ("offset"), the usable signal is placed at a frequency above 100 Hz by modulating the THz source. The usable signal exiting from the sensor comes from the demodulation of the signal received by the electronics.

The function of the point sensor 600 and its proximity electronics is to rectify the THz wave and supply an impedance-matched signal for the following electronic stages. In the electronics 615, the subtractor followed by an amplifier, or a differential amplifier, makes it possible to amplify the usable signal generated by injecting current into the transistor.

The signal is digitized at high speed (acquisition frequency >1 kHz) as close as possible to the analog output. The signal is demodulated synchronously with the modulation signal of the source, which ensures a maximum signal-to-noise ratio by eliminating all the additive noises with a frequency other than the modulation frequency of the source. The digital output from the sensor is synchronized with the absolute positions of the object to be imaged.

With respect to the electronics of the mono- or multi-pixel sensor, for the analog circuit a current is injected into the channel of the transistor.

To increase the sensitivity of the HEMT-based THz sensor, a current of the order of several dozen µA is injected into the channel of the transistor. This results in the electrical response in the presence of THz radiation being increased by several orders of magnitude. The injection is made by a current-generating component directly connected to the transistor by its drain; the component can be, for example, an LM334 combined with a resistor, the choice of the resistance value making it possible to parameterize the amount of current injected.

As the usable signal at the terminals of the transistor in the presence of THz radiation is the voltage between its drain and its source, it is necessary to insulate the transistor and the component injecting the current from the rest of the amplification chain by a follower assembly having a very high impedance. As a result, the injected current can only be propagated in the transistor and not in the amplification chain.

Analog Correction of the Offset Generated by the Current

Since the resistance of the transistor channel is of the order of k Ohms, injecting the current into the channel generates a continuous offset at its terminals. This offset is present whether there is THz or not. This offset can be of the order of several hundred mV, which poses a problem for the amplification channel. The amplifiers amplify both the usable signal generated by the THz and the continuous offset: beyond a certain level, the offset causes saturation of the inputs of the various amplifiers. It is therefore necessary to subtract a continuous voltage of the same order of magnitude as the offset voltage from the signal generated by the transistor so as to enable the amplification chain to remain within its operating range on input.

Amplification

The amplification is chosen such that it generates low noise, and has as low a drift as possible and sufficient bandwidth for the working frequencies. For example, an OPA735 amplifier from Texas Instruments has the required performance levels. Traditionally, two amplification steps are chosen: the first is a fixed gain of 10 or 100 close to the sensitive surface, which ensures the transport of a signal several orders of magnitude stronger than the level of noise induced by the circuit. Next is the second amplifier, of variable gain (for example between 1 and 10), close to the analog-digital converter (ADC). This makes it possible overall to achieve a maximum amplification factor of 1000 while being capable of adjusting the amplification to fill the conversion range of the ADC.

Figure 18:
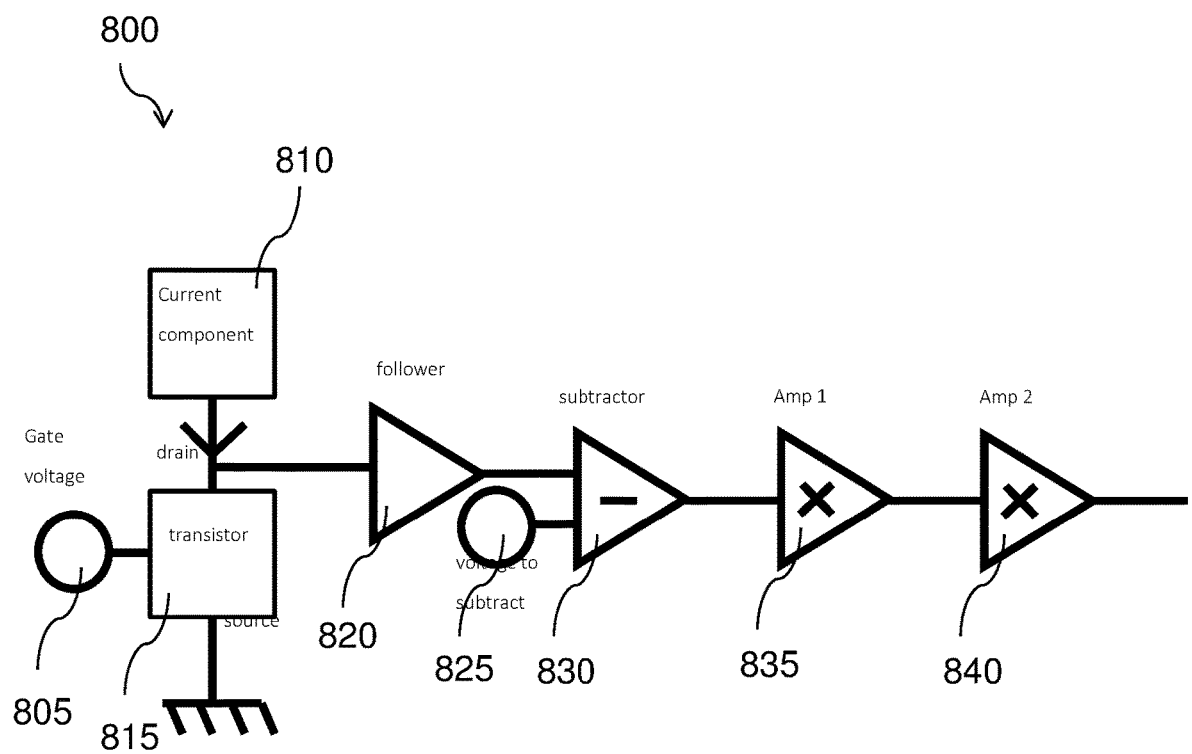
FIG. 18 represents an electronic diagram for a THz microscope.

FIG. 18 shows a transistor 815 receiving a gate voltage 805 and a current injection point 810 on its drain, the voltage on the drain being supplied to a follower 820. On exit from the follower 820, a subtractor 830 subtracts a voltage 825, then two amplifiers 835 and 840 amplify the signal.

Modulation/Demodulation of the Signal

The noise generated by the transistor increases significantly when current is injected. It is no longer of interest to operate it in continuous mode (DC) since the noise level is too great, especially the low frequency noise linked to the offset voltage. However, by placing the usable signal at a frequency of the order of kHzs, a signal-to-noise ratio above 60 dB is obtained, compared to about 45 dB in continuous mode with no current injected. The interest of injecting current lies in the signal-to-noise ratio, which is better with the current for a working frequency of between 100 Hz and 100 kHz.

There are several methods for modulating and demodulating a signal, in particular synchronous detection which is widely used in THz systems. This method has one drawback: it requires long integration times that significantly reduce the acquisition speed.

In this case, the procedure is as follows: the source is modulated externally by a programmable electronic component (for example an FPGA) that controls a radio-frequency amplitude modulator. The programmable component controls the high and low states of the modulation: for one state, the THz is emitted by the source; for the other, no signal is emitted. Alternatively, the signal received by the sensor is either the usable signal linked to the presence of THz radiation, or the background noise when THz is absent. The programmable component samples the signal coming from the sensor during the high states and the low states, and it produces two averages: one for the average signal level at the high state and the other for the average signal level at the low state. By subtracting these two averages, one obtains the signal corresponding to the THz alone filtered of its low component frequencies, thanks to the high-low difference, and filtered of its low component frequencies, thanks to the average of each high and low state. It is this averaged differential signal that is produced on exit from the sensor.

The advantage of this method is the fact that high acquisition speeds can be retained provided there are rapid ADCs (200,000 samples per second, for example), and suitable amplification bandwidths. This method is also not very costly in calculations, which means it can be implemented for a whole detector matrix, as the calculation is performed independently on each sensor.

Figure 17:
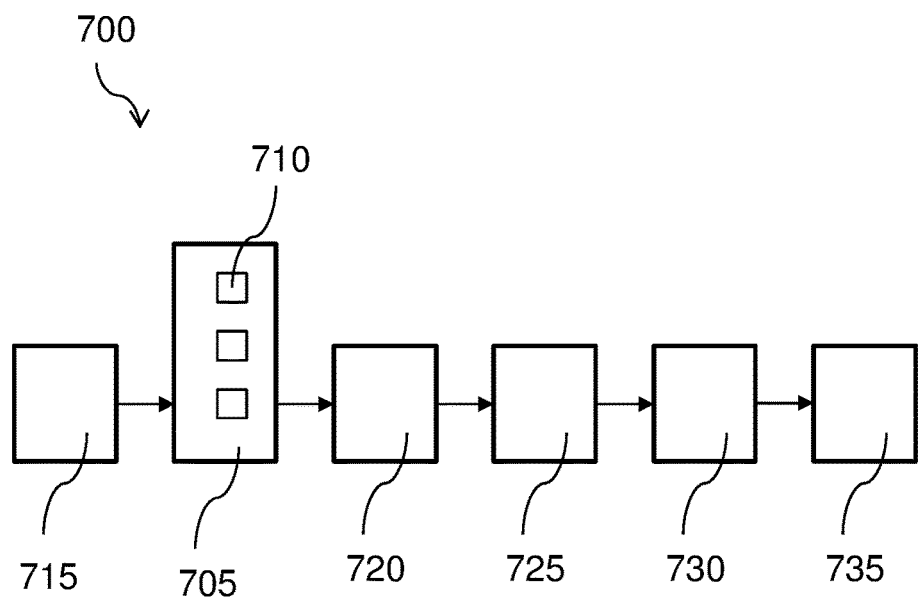
FIG. 17 represents, schematically, a multi-pixel sensor.

This architecture ensures increased sensitivity, a reduced signal noise and a synchronization of the signal with the optimum position of the object.

Where a linear sensor having one or more lines of photosites (or pixels) is used, this multi-pixel sensor 700 comprises, as shown in FIG. 17:

one or more rows 705 of THz detectors 710. Each THz detector is a GAAS, or INP RF nano-transistor using a technology of less than 0.25 µm which, by a plasma effect in its channel, rectifies the THz waves in the bands 0.1 THz to 2.5 THz. Each nano-transistor is packaged in a micropackage having a surface area of less than 0.5 mm$^2$;

proximity electronics 715 for polarizing each detector. To be an efficient rectifier, a nano-transistor is polarized via a gate voltage close to its swing voltage where the standard operation of the transistor is the most nonlinear. The rectified signal is amplified by forcing an asymmetry of the loads in the channel through the injection of a current between the drain and the source;

proximity electronics 720 for shaping the THz signal. The rectified signal is a continuous potential difference between the Drain and the Source of the nano-transistor measured in common or differential mode. The proximity electronics 720 are high impedance so as to not attenuate the amplitude of the signal and to force the polarization current to be injected into the transistor and not into the amplification circuit. A subtractor assembly compensates for the offset generated by injecting the current between the drain and the source. One or more low-drift low-noise amplifiers amplify the signal over the dynamics of the Analog-Digital Converter (ADC) 725;

electronics 725 for digitizing in parallel the signal. This analog-digital converter 725 has significant dynamics in amplitude (>12 bits) and is rapid (>100 kSamples/s, i.e. 100 thousand samples per second);

a signal acquisition and processing system 730 for reducing the noise. In the same way as the point sensor, the THz source is amplitude modulated, which makes it possible to produce an averaged differential measurement;

a system 735 of high-speed communication via an Ethernet, USB or cameralink (registered trademarks) communication protocol.

The sensor and the source are synchronized via a digital clock signal. The source is amplitude modulated via this clock signal, which makes it possible to measure and compensate for the residual signal (offset) present at the sensor's terminals when THz is absent. The compensation is both digital, via a high-frequency subtraction of the signal measured with THz and without THz, and analog, by adjusting the voltage to be subtracted from the sensor's signal in order to maintain the overall level within a specific voltage range.

In the case of the mono-pixel sensor, the absolute positions of the object to be imaged are measured by an encoder. These position data are then synchronized with the data coming from the THz sensor for use over the entire course of the movement, including in the acceleration areas, and for exploitation of the outward and return movement through the setting of the odd and even lines avoiding a shear phenomenon. Lastly, averaging the data established on the absolute positions and not on the time enables adaptation to all speeds of movement.

This architecture ensures the greatest sensitivity, a reduced signal noise and a synchronization of the signal with the optimum position of the object.

The multi-pixel sensor 700 makes it possible to spatially expand the field of view and therefore to produce high-resolution images with a high refresh rate (line frequency >1 kHz). Each sensor 700, including its proximity electronics, is responsible for rectifying the THz wave it receives locally and supplying an impedance-matched signal for the following electronic stages. In the electronics 720, each subtractor circuit followed by an amplifier, or a differential amplifier, makes it possible to amplify the usable signal.

The signal is digitized at high speed (acquisition frequency >1 kHz) as close as possible to the analog output.

The signal is demodulated synchronously with the modulation signal of the source on the signals coming from each pixel, which ensures a maximum signal-to-noise ratio by eliminating all the additive noises with a frequency other than the modulation frequency of the source.

The multi-pixel sensor 700 is situated in the focal plane of the imaging optical system. Each point sensor is responsible for rectifying the THz wave, and amplifying the usable signal. The signal is digitized at high speed (acquisition frequency >1 kHz) as close as possible to the analog outlet.

The sensors' small surface area enables great compactness and as a consequence high spatial resolution. The photosensitive components are arranged in a line with, for example, a space between two components of 300 µm and an interpixel of 800 µm, each component having dimensions of 500 µm×1 mm. The individual polarization of each sensor makes it possible to ensure uniformity of sensitivity between sensors while retaining high sensitivity. Parallel management of all the signals makes it possible to ensure a very high acquisition speed. Processing of the embedded signal enables real-time filtering to obtain the best signal-to-noise ratio. Communication via an Ethernet, USB or cameralink communication protocol makes it possible, by package management, to send the high speed lines for chaining several multi-pixel sensors without loss of data.

The starting point for the design of imaging systems for a linear sensor is the spatial resolution imposed by the sensor. The imaging device that is the subject of the invention has, in its multi-pixel embodiments, an interpixel of 800 µm and, depending on the model, a line of 64, 128 or 192 pixels. Through the choice of the field of vision of the side of the object to be imaged, the optimum spatial resolution of the sensor and lens unit assembly is imposed.

For example, in the case of a field of vision of 30 mm on the object side, it is necessary to ensure correct sampling of the scene according to the Shannon criteria (four pixels for a pair of lines at maximum resolution). Therefore, the optimum spatial resolution of the camera (sensor and lens unit) is 0.53 pl/mm (pairs of lines per millimeter) in frequency. A higher optical resolution of the system might not be sampled correctly by the camera and a lower optical resolution might result in an excessive number of pixels/mm, thus not benefiting from all the resources available. This approach also directly indicates the necessary magnification for the optical system, in this case 1.71×.

Following this preliminary, the optical system can be given a performance target. Knowing the working frequency, for example 255 GHz, using the Airy function it is calculated that the lens unit to be designed must have an object-side f-number of 1.31 and an image-side f-number of 2.23. The size of the diameter of the lens unit needed to achieve this f-number can also be calculated: in this case 75 mm.

Given the optical parameters determined above, it can be seen that the lens unit to be designed to tackle the problem is a microscope type of lens unit. In effect, unlike photographic or telescope lenses, microscope lenses have the following overall characteristics: the scene to be imaged is smaller than the size of the sensor, the pixels of the sensor are of the same order of magnitude as the average details of the scene. The reproduction ratio is much higher than one (a scene of 100 µm×100 µm will be reproduced on a sensor of 10 mm×10 mm: i.e. 100× magnification). The lens unit works at a short distance from the object, and its object aperture can reach values such as 0.7.

With respect to the use of a microscope lens unit, it is noted that a microscopy optical system makes it possible to both magnify the object to be observed and to separate the details of this object so it can be observed. The combination of a magnification and a power of resolution characterizes such an optical system.

In the context of imaging systems with a microscope lens unit for THz imaging, firstly as the scene is generally smaller than the size of the detector matrix, and the detector is of the order of magnitude of the details of the scene, it is therefore necessary to magnify the scene and its details in order to image it. Secondly, the image of the scene must be formed ensuring a sufficient resolution of the object so its details can be observed, which generally entails working with high apertures, therefore close to the object, and with optics having a large diameter in comparison to the scene.

The microscope lens unit is best qualified to handle the problem of THz field imaging:
the pixels of the sensor are large compared to the details of the image to be formed;
the sensor is large: >150 mm for 192 pixels; and
the resolution to be achieved requires very high f-numbers.

The consequence of this choice is that the lens unit is large, of a similar size to, or larger than, the objects to be imaged.

The results in terms of the number of lenses of the optics, their shapes and their dimensions are very dependent on the magnification envisaged, the resolution expected, and the set-up of the lens unit (distance between the object and the first lens).

The lens units have a minimum of two lens groups:
1st group: close to the object, enables the light coming from the object to be collected with the targeted aperture; and
2nd group: close to the image, enables the image of the object to be formed with the targeted image aperture.

For lens units with low constraints (for example magnification by two, and short wavelength) it is possible to design a lens unit on this principle with a single lens per group, therefore just two lenses in total. This is made possible in particular thanks to the capacity to manufacture aspheric lenses.

For lens units with greater constraints (for example magnification by 1 and high wavelength), more than one lens per group needs to be used:
field compensator in the first group to limit the field curvature; and
two or three lenses in the second group to limit the thicknesses and aberrations.

In certain embodiments, the lens unit actually has three lens groups, the second group being divided into two sub-groups separated by a significant air space, this is the case in particular when the lens unit has image-side telecentricity.

Examples of Realization

Figure 3:
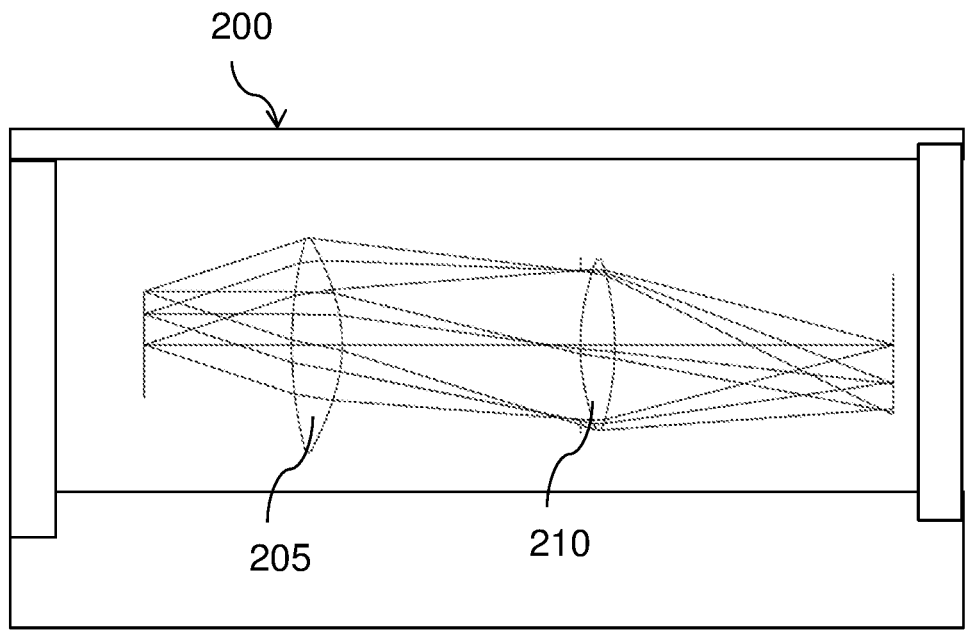
FIG. 3 represents, schematically and in cross-section, a first embodiment of an imaging lens unit utilized in devices that are the subjects of the invention.

Example 1, FIG. 3: Object Field 40 mm, Magnification 1.3×, 235 GHz

The lens unit 200 has two groups 205 and 210, with one lens each, it is not telecentric on the image side. This lens unit 200 has been designed with the constraint of an object sampling rate above 50 mm. The MTF (acronym for "modulation transfer function") shows a resolution of 0.4 pl/mm, i.e. 1.92 mm resolution applied to the object. The spot diagram shows that the system is limited by diffraction over the entire field: the image is not disrupted by the aberrations.

Figure 4:
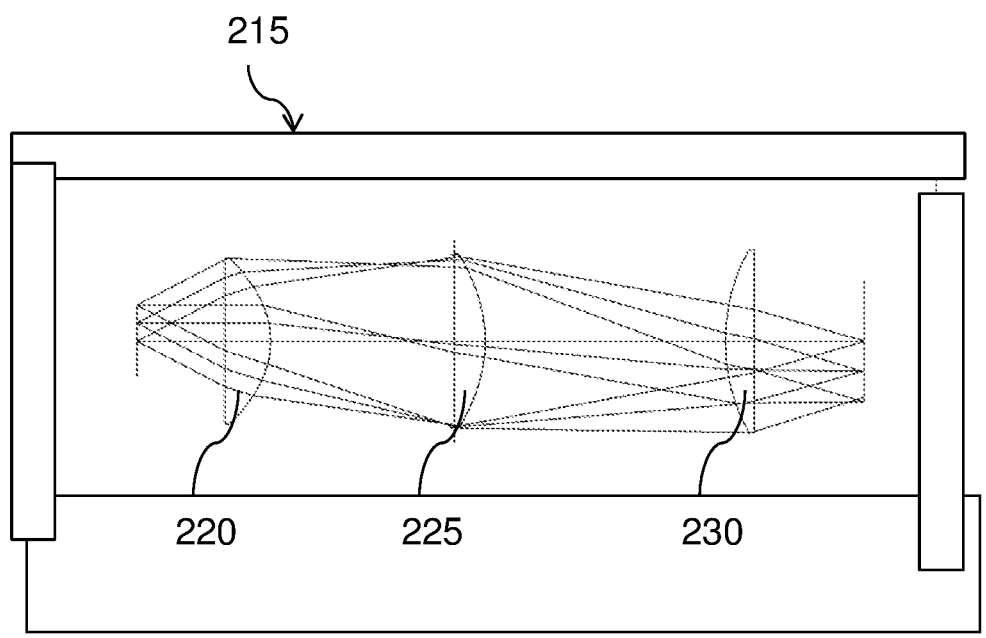
FIG. 4 represents, schematically and in cross-section, a second embodiment of an imaging lens unit utilized in devices that are the subjects of the invention.

Example 2, FIG. 4: Object Field 30 mm, Magnification 1.7×, 235 GHz

The lens unit 215 has three lenses 220, 225 and 230, the second group being divided into two sub-groups of one lens. Image-side telecentric lens unit. The image-side MTF shows a resolution of 0.45 pl/mm, i.e. 1.3 mm resolution applied to the object. The spot diagram shows that the system is limited by diffraction over the entire field: the image is not disrupted by the aberrations.

Figure 5:
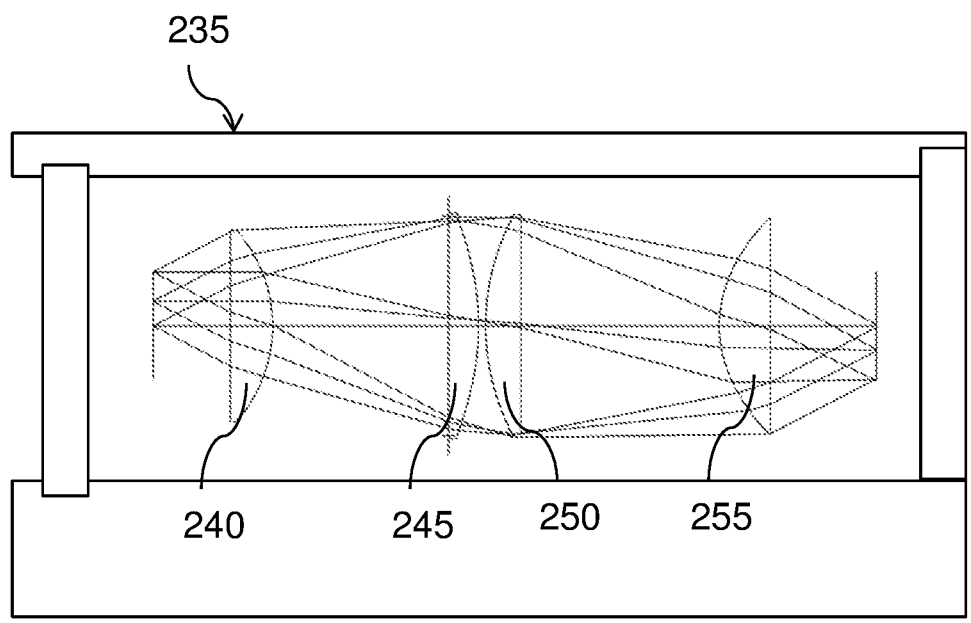
FIG. 5 represents, schematically and in cross-section, a third embodiment of an imaging lens unit utilized in devices that are the subjects of the invention.

Example 3, FIG. 5: Object Field 52 mm, Magnification 1×, 140 GHz

The lens unit 235 has a second group divided into two sub-groups. Four lenses 240, 245, 250 and 255 are necessary to obtain the magnification of 1 and the image-side telecentricity. The image-side MTF shows a resolution of 0.40 pl/mm, i.e. 2.5 mm resolution applied to the object. The spot diagram shows that the system is limited by diffraction except on the edge of the field (slight defect).

Figure 6:
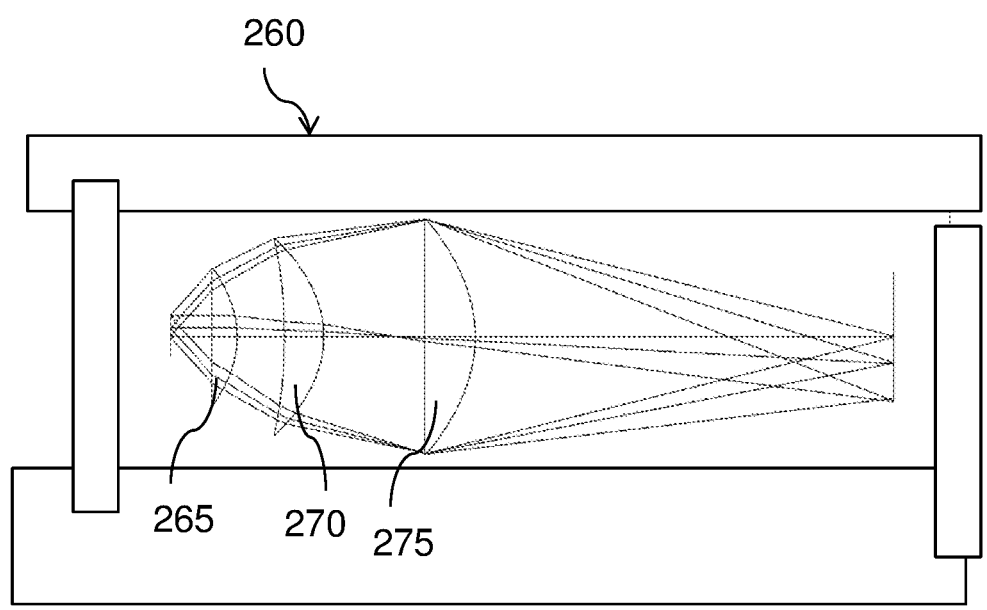
FIG. 6 represents, schematically and in cross-section, a fourth embodiment of an imaging lens unit utilized in devices that are the subjects of the invention.

Example 4, FIG. 6: Object Field 50 mm, Magnification 3.1, 235 GHz

The lens unit 260, for high magnification, has two groups with a field compensator in the first group. This lens unit, with three lenses 265, 270 and 275 enables resolutions of less than the wavelength to be achieved. The image-side MTF shows a resolution of 0.41 pl/mm, i.e. 780 µm resolution applied to the object. The spot diagram shows that the system is limited by diffraction except on the edge of the field (slight defect).

The THz imaging lens unit is used to project the image of an object situated in the field towards an image plane situated opposite the lens unit. The condition for operating within the specifications is to have a sufficiently strong input THz signal for the detection sensitivity in the image plane. In a conventional realization, this lens unit is integrated in a chain including a source, a system for projecting the illumination of the source, the lens unit itself, a multi-pixel sensor and a computerized analysis system (not shown).

The lens unit is therefore a key element in the chain described above, since it provides the optical spatial resolution on the object to be imaged. The dimensions of the lens unit are intrinsically linked to its performance: the higher the desired resolution, then the larger the lenses and the longer the lens unit.

Using a line of pixels as sensor requires using illumination on a line of the scene to concentrate the energy of the source on a portion of the object observed by the linear sensor. The source emits radiation over an emission cone determined by its horn. The distribution of energy in the emission cone is a non-linear, circular energy distribution since this generally has a Gaussian distribution and rotational symmetry. The system for linearizing the source has two objectives:
making the illumination of the source linear; and
making the illumination of the source uniform over the scene.

Figure 7:
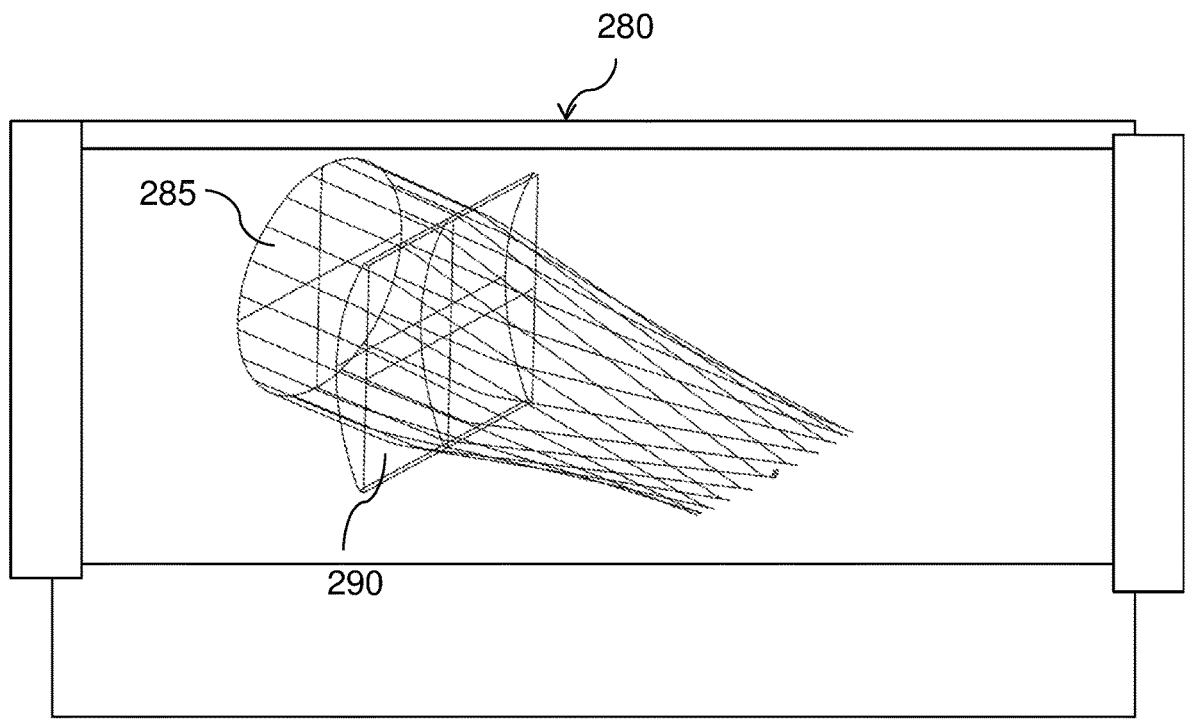
FIG. 7 represents, schematically and in cross-section, a first linear illumination means utilized in devices that are the subjects of the invention.

In some embodiments, the illumination of the scene is designed to be parallel in one direction, and focused in the perpendicular direction. Use of a cylindrical lens 290 is one solution for achieving this objective. The beam 285 coming from the source is expanded over the same diameter as the scene to be imaged then, with a lens having aspherical curvature with cylindrical geometry (not revolution geometry), the radiation is focused in a single direction of the space, as shown in FIG. 7.

Linearization 280 by the previous method exhibits a non-uniform illumination since the distribution of the source's illumination is not uniform. Focusing the energy distribution of the source in a single direction of the space retains the same non-uniform distribution transferred along the line of illumination.

Figure 8:
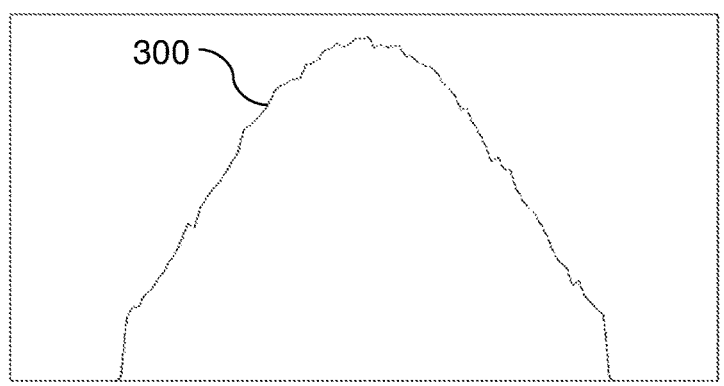
FIG. 8 represents a non-uniform illumination curve.

FIG. 8 represents an energy distribution 300 on exit from source 100.

Figure 9:
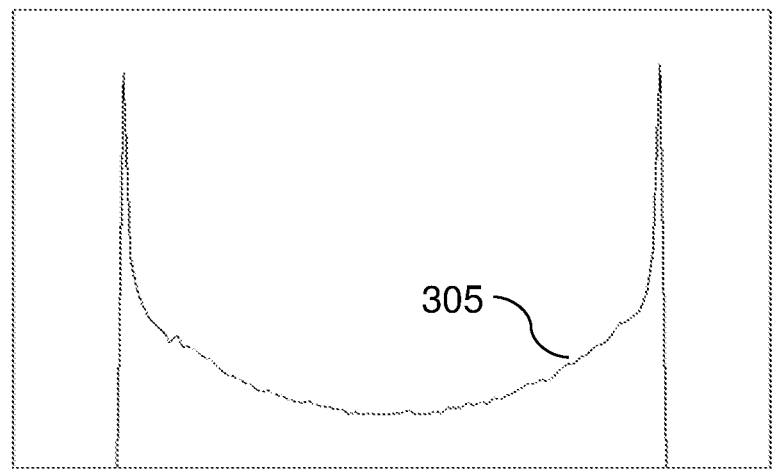
FIG. 9 represents an emission curve of a light source for compensating for the non-uniform illumination shown in FIG. 8.
Figure 10:
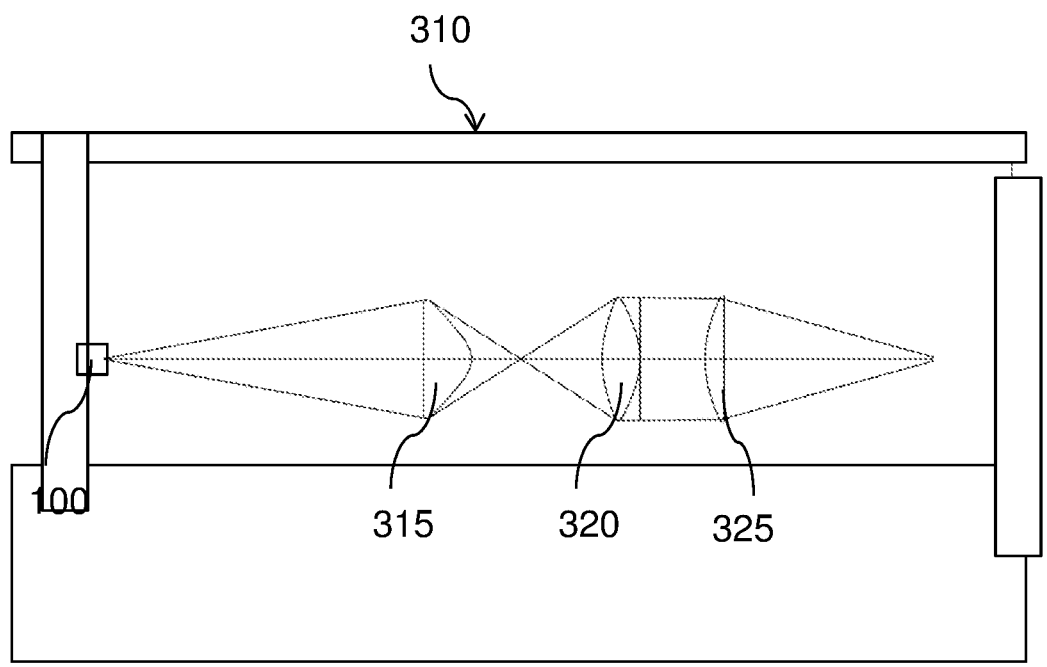
FIG. 10 represents an optical system substantially providing the emission curve shown in FIG. 9.

With optical design software, it is possible to calculate the optimum revolution geometry to ensure a uniform illumination after transformation by the cylindrical lens. As this distribution is known, the software uses it as target for optimizing the lenses shaping the beam exiting from the source 100. For example, an illumination having a distribution 305, shown in FIG. 9, forms a uniform distribution after a cylindrical lens.

To achieve uniformity of the illumination over the line observed by the linear image sensor, a system 310 with three lenses 315, 320, 325 is formed in two design steps:
 during a first step, the distribution 305 required on input to the cylindrical lens 325 is calculated;
 during a second step, a system with two aspheric lenses 315, 320 is optimized to form this distribution 305.

Figure 11:
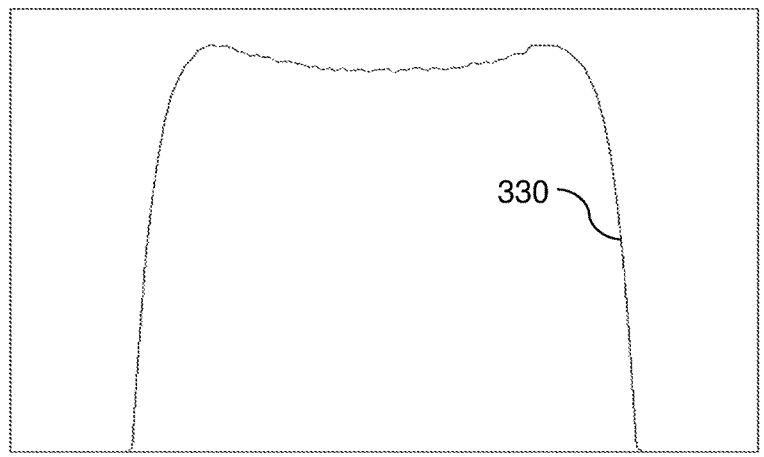
FIG. 11 represents a substantially uniform illumination curve provided by the optical system shown in FIG. 10, with the linear illumination means shown in FIG. 7.

FIG. 11 shows the distribution 330 resulting from the utilization of the optical system 310.

Figure 12:
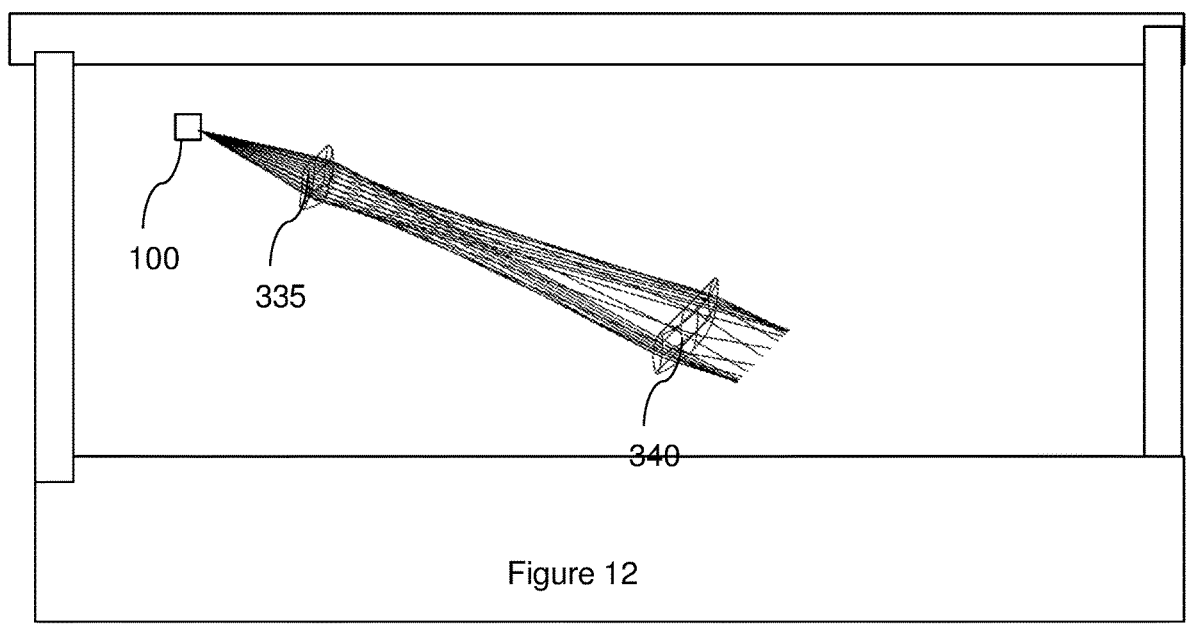
FIG. 12 represents, schematically and in perspective, a second linear illumination means having surfaces without rotational symmetry.
Figure 13:
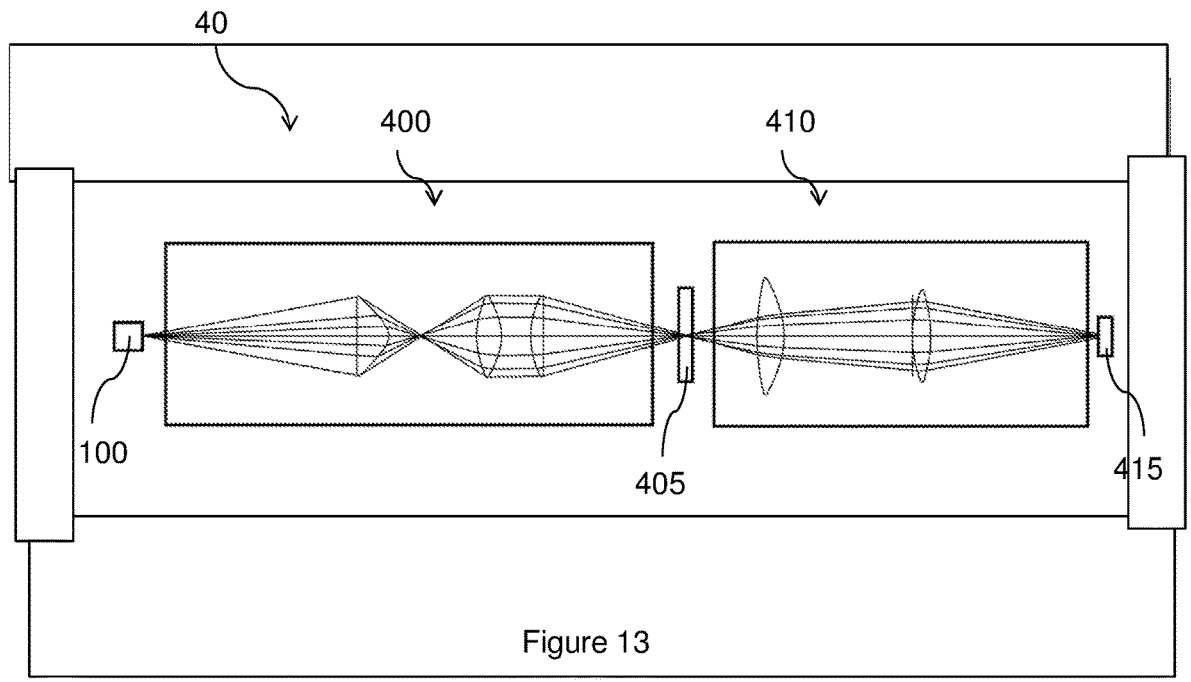
FIG. 13 represents, schematically and in cross-section, a first particular embodiment of the device that is the subject of the invention.

In another linearization method, the two lenses 315 and 320 for shaping the beam are replaced by a single lens, having at least one surface not rotationally symmetrical (sphere, asphere) but representing splines or polynomials. In this case, an assembly of two lenses 335 and 340 enables the illumination to be made linear and uniform, as shown in FIG. 12:
 the lens 335 is used for shaping the beam to prepare the energy distribution (lens with polynomial surface XY, for example)
 the aspheric cylindrical lens 340 performs the focusing of the beam in a single direction.

The advantage of this method is that it is simpler to utilize with calculation software: a macro for the transition from the Gaussian circular illumination to uniform linear illumination is directly implemented at the optimization level without going through an intermediate step of calculating the illumination required on input to the cylindrical lens 340. The calculation of the macro, complex for a system with rotational symmetry, eliminates this symmetry right from the first lens. This has the advantage of reducing the number of lenses required.

The design of the illumination takes the source used into account (wavelength, divergence). The illumination system enables enough THz energy to be projected onto a plane of the space for a collection lens unit and a sensor to then be used to form an image of an object placed in this plane of the space.

The linearization system makes it possible to choose how to distribute the energy coming from the source in order to illuminate the scene most effectively. A system benefiting from this type of illumination has the greatest energy efficiency, which makes it possible to use less-sensitive sensors, or to produce images of objects that are very opaque or not very reflective.

In another embodiment the illumination can be a rectangle whose height and width can be chosen by the designer. In this case, the illumination is collimated on the object to be studied, which makes it possible firstly to have a greater depth in which the illumination is optimum, and secondly to have the exit aperture of the illumination at infinity to avoid a portion of the image of the source being superimposed onto the image of the object.

To produce a rectangular illumination, one proceeds according to the second method described above: a photometric calculation makes it possible to determine a macro for the transition from the Gaussian rotationally-symmetrical illumination to uniform rectangular illumination (or rectangular with a specific intensity profile. In addition, the zero point angle of incidence of the rays on the object is imposed to make the illumination collimated). The macro is implemented in the design software to optimize the two lenses having a surface not rotationally symmetrical that generate a rectangular illumination, as specified by the designer, at the level of the object.

Where a point sensor (single photosite or pixel) is used, the principle of the point imaging device is based on two lens groups:
 a first group performs the shaping of the beam to achieve the desired resolution; and
 a second group performs the collection of the flow transmitted through the object to be imaged.

In this imaging mode, the spatial resolution is solely linked to the first optical group situated in front of the object. The flow collection portion has no impact on the spatial resolution of the image formed. Optimization of the second group is based on the energy flow collection principle: the objective is to concentrate the energy on the sensor as much as possible in order to obtain the highest signal-to-noise ratio.

Two imaging modes are used, depending on the object types to be imaged.
 Transmission mode, through the object: transmitted measurement of the intensity, and/or polarization, or path difference per sample.
 Reflection mode, on the object: reflected measurement of the intensity, and/or polarization, or path difference per sample on the surface or in depth.

The point imaging device proposed enables images of the object to be produced simultaneously in reflection and in transmission. For this, it uses two flow collection groups situated upstream and downstream from the object. It can also control the amplitude of the source for calibration in order to produce absolute measurements.

In addition to its optical components, the point imaging system can incorporate the following elements:
 A CW or modulated THz source;
 One or more point or multi-pixel sensors (linear);
 A Cartesian table for moving the sample with at least one encoder on the rapid movement axis;
 A computer system, which creates the image by synchronizing with the absolute position of the Cartesian table the signal synchronized with the modulation of the source.

The maximum resolution is obtained for a very short focusing lens, of the order of 10 or 20 mm. As a result, the space available for inserting the sample may be very limited for large-sized samples. The imaging device proposed presents a solution to this problem thanks to a modular system enabling the resolution to be changed according to the size of the object to be imaged.

The beam coming from the source is first collimated by a first lens. The collimated beam is propagated with parallel rays after this lens, which makes it possible to place the lens that focuses the radiation at any distance from the collimating lens.

The plane for focusing on the object is chosen such that the beam is focused at the same place on the optical axis by an optical system with a short focal length enabling a high resolution, and therefore placed close to the object, or by a lens with a long focal length enabling a lower resolution but allowing a more voluminous object to be measured, said lens being placed close to the source.

Thanks to this system, the mechanical integration is facilitated and the ergonomics of the system are improved because the resolution of the system can be modified easily, by changing the focusing lens, while keeping the same distance between the source and the object.

In transmission mode, the flow collection is performed by a group of two lenses placed after the object. The collector used has an f-number at least equal to that of the first group, in order to ensure maximum efficiency.

The first lens can be identical to the focusing lens. It collects the flow coming from the object, and makes the beam have parallel rays (collimated). The modularity of resolution described above is retained thanks to this system by allowing the second lens to be positioned at any distance from the first.

The second lens situated in front of the detector makes it possible to focus the THz beam on the photosensitive surface by concentrating the energy to maximize the signal-to-noise ratio. The aperture used for this lens is, for example, 1.25. This value can be chosen as a compromise between energy concentration (lower aperture value) and focusing stability: a higher aperture enables the focusing on the sensor to be made less dependent on possible distortions of the beam linked to mechanical dilations or to the simple disruption of the beam by the object.

In reflection mode, the flow collection is performed by the addition of a beam splitter and a lens. The assembly is placed in front of the lens for focusing on the sample. The beam splitter makes it possible to let the incident THz beam pass between the source and the object. Once reflected onto the object, the THz signal is collected by the focusing lens, then reflected onto the beam splitter to be sent at 90° onto the lens situated in front of the sensor. The lens in front of the sensor is the same as the lens used in transmission mode.

The beam splitter introduces a loss of signal at each passage through reflection of a portion of the energy from the source on the outward path, and through transmission of a portion of the energy reflected from the object on the return path.

With regard to the polarization mode, the THz wave is an electromagnetic wave that can be specifically polarized to examine a specific response from materials, e.g. birefringence.

To do this, the incident wave must be circularly polarized. A retarder component may be used to transform a linear polarization into a circular one, for example:
 a quarter-wave blade;
 a horn; or
 a 120° prism assembly.

The analyzer analyzes the ellipticity, the phase shift of the ellipse and the direction of rotation of the ellipse. The techniques used are:
 rotation of a half-wave retarder+Polarizer and acquisition of the energy over at least 180° to reconstitute the parameters of the ellipse; and
 decomposition of the wave transmitted over at least three sensors equipped with polarizers that analyze at least three preferred polarization directions.

The analysis is performed on a single sensor that incorporates:
 the amplitude measurement over two perpendicular polarization directions by means of two plasmonic nano-transistors equipped with their antenna; and
 the measurement of the phase shift of the ellipse and its direction of rotation by means of a nano-transistor equipped with cross antennas.

Modularity offers a very flexible platform for measuring the thickness of the samples (objects to be imaged) through the management of the sampling rate, the need for a suitable spatial resolution, imaging in transmission mode for completely transparent materials, in reflection mode for the objects where one of the materials may be opaque, in polarization mode for the materials which have a preferred propagation axis (the term 'birefringence' is used).

Combined use of the THz source (modulation and broadband), sensors (very sensitive, rapid), encoders of the Cartesian table (absolute position) and the acquisition system (synchronization, filtering) makes it possible to form an image with very high sensitivity, without movement artifact, without standing wave and with very low LF and HF noise.

Figure 14:
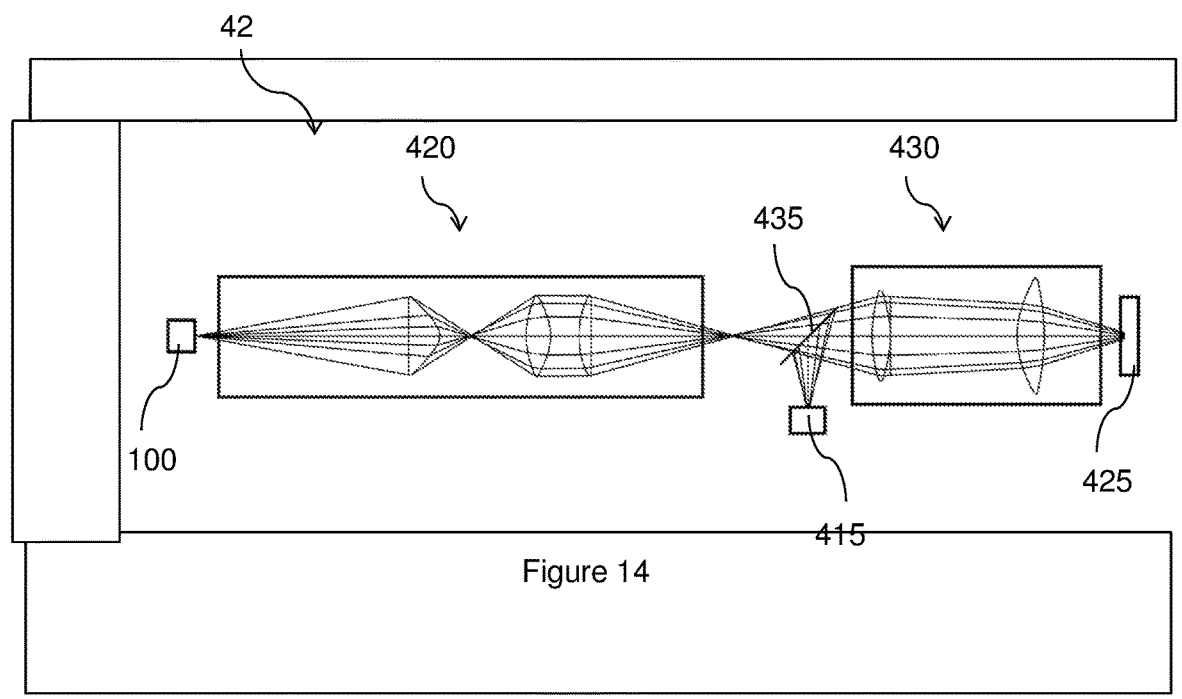
FIG. 14 represents, schematically and in cross-section, a second particular embodiment of the device that is the subject of the invention.
Figure 15:
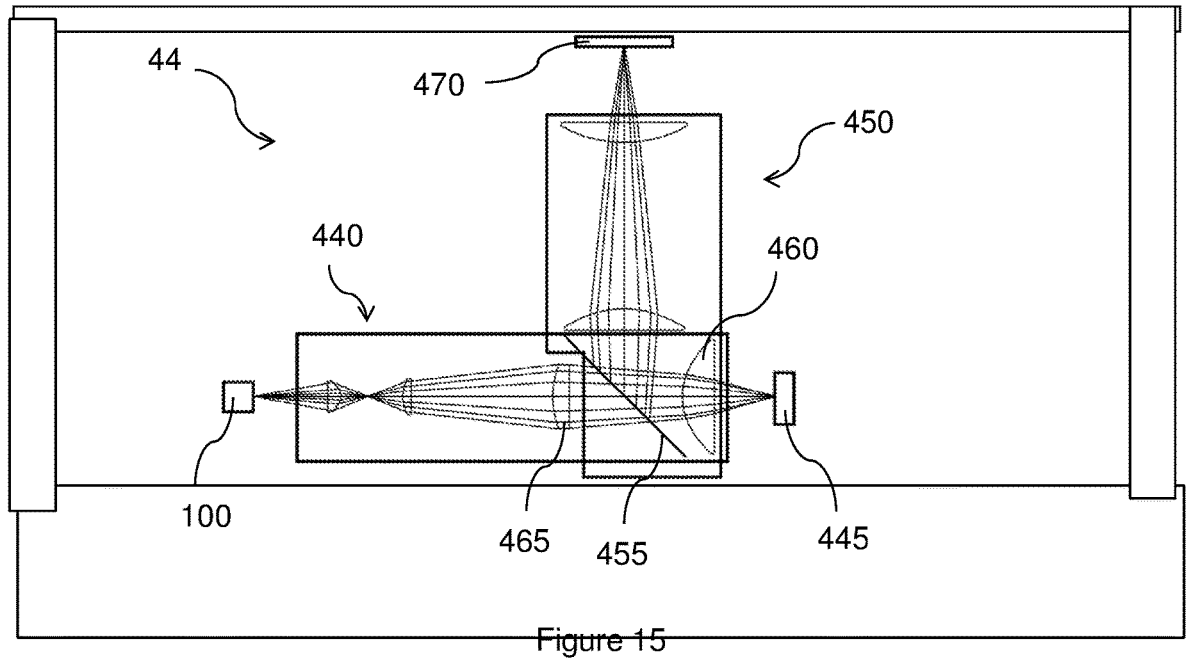
FIG. 15 represents, schematically and in cross-section, a third particular embodiment of the device that is the subject of the invention.

With respect to the beam separator, for example the blades 435 and 455 shown in FIGS. 14 and 15, High Resistivity silicon is used very commonly in the THz region to manufacture optical windows, beam splitters, or hemispherical collection lenses. Preferably, the image capture system that is the subject of the invention uses this material for its semi-reflecting blades. The very high index of 3.41 makes it possible to obtain, on a single surface of material, a separation of the beam into two components, reflected and transmitted, of 45% and 55% respectively.

The blade must be carefully designed to perform the beam splitter function (ideally 50% transmission and 50% reflection), since the passage through the two surfaces of the blade leads to interferences of the beam with itself, which makes the performance levels of the component vary significantly.

Preferably, the beam splitter has an anti-reflective treatment on a single surface of its material. As a result, no reflection appears on this surface, and the interferences are not produced. Preferably, a material is chosen for the treatment with an index close to 1.8, and its thickness is matched to a submultiple of the wavelength.

In some embodiments, a separation efficiency of 50% is obtained by choosing the thickness of the blade: the thickness that produces an efficiency level of 50% can be determined by calculating the components of the incoming wave.

With respect to the incident polarization on the beam splitter, preferably TM mode (acronym for transverse mode) polarization, in which the field is parallel to the plane of incidence, is used. In effect, the inventor has determined that TM mode polarization ensures better stability of the separation efficiency when the thickness of the beam splitter varies in its manufacturing tolerance.

In order to be as efficient as possible, the beam splitter is used on a weakly divergent beam. Preferably, it is inserted into a collimated beam. The optical beam passes through the beam splitter twice: once when it comes from the source, a second time when it returns from the object towards the detector.

The beam splitter is used to design a reflection mode optical system, in which the illumination of the object and retrieval of the flow coming from the object are performed on the same side of the object.

A multi-pixel imaging device that is the subject of the invention incorporates the following elements:
 a THz source;
 an optical system consisting of lenses to perform the linear illumination;
 an optical system consisting of lenses to perform the collection of the illumination after transmission through the object or reflection on the object;
 a beam splitter in the case of reflection;
 a multi-pixel sensor; and
 a unit for processing the signal exiting from the sensor.

Generally, transmission mode is complicated to use, either because of the dimensions of the object, or because of industrial environment constraints. Reflection mode is therefore commonly used. There are several ways of arranging the illumination and the lens unit to implement this mode.

In transmission mode, the complete optical system has two separate parts 400 and 410, one for the linear illumination and the other for the imaging lens unit. For example, in the optical system of the device 40 shown in FIG. 13, the three lenses on the left, part 400, are for the illumination, the two on the right, part 410, for the lens unit. Between the two, the free space allows the object 405 whose images must be captured by the sensor 415 to be inserted.

The aperture of the illumination is matched to the aperture of the lens unit so energy is not lost outside the lens unit.

In an embodiment of the device 42 shown in FIG. 14, with reflection through the entire lens unit, the three lenses on the right 420 form the illumination, which is projected at the level of the image plane of the lens unit 430. The illumination then passes by the lens unit 430 to be projected onto the object 425. Lastly, the lens unit 430 forms the image of the object 425 which is projected at 90° onto the sensor 415 by means of a semi-reflecting blade 435.

The illumination is therefore designed to uniformly illuminate the object 425 through the lens unit 430.

In an embodiment of the device 44 shown in FIG. 15, with reflection inside the lens unit, the illumination 440 takes an additional lens 460 into account after the cylindrical lens 465: the last lens of the lens unit 450. In this way, the illumination is inserted directly at the exit from the lens unit 450. The lens unit 450 operates by means of a semi-reflecting blade 455 which sends the light reflected at 90° towards the two other lenses and the linear sensor 470.

The advantage of this design is that it is more compact and introduces fewer losses, with the THz beam passing through fewer lenses between the source and the sensor.

The illumination system enables a uniform illumination of the scene, the collection system a very high resolution exploited by the extreme pixel compactness of the multi-pixel sensor.

The invention claimed is:

1. A device capturing point values for constituting an image of an object, that comprises:
   an incoherent source of rays, the frequency of which is between 0.075 THz and 10 THz for illuminating the object;
   a sensor of radiation coming from the object, which comprises an area sensitive to the radiation coming from the source and which emits an electrical signal representative of the intensity of the rays coming from the source and reaching the sensitive area of the sensor; and
   at least one optical focusing system with aperture number, or f-number, that is less than one, situated on the optical path of rays emitted by the source and propagating from the source to the sensor of rays, passing via the object, said at least one optical focusing system comprising at least one lens between the incoherent source and the object, to direct the rays emitted by the source on the object and at least one lens between the object and the radiation sensor, to direct the rays from the object onto the sensitive area of the sensor.

2. The device according to claim 1, wherein the incoherent source has a bandwidth of several GHz.

3. The device according to claim 1, wherein the incoherent source has a bandwidth at least equal to 12 GHz at −100 dB.

4. The device according to claim 1, wherein at least one optical system comprises an aspheric optical lens.

5. The device according to claim 4, wherein the scattering, as a percentage, for the indices of the materials used for the optical lens, over the frequency ranges of the source, is less than 1%.

6. The device according to claim 4, wherein the scattering, as a percentage, for the indices of the materials used for the optical lens, over the frequency ranges of the source, is 0.2% from 100 to 300 GHz.

7. The device according to claim 4, wherein the scattering, as a percentage, for the indices of the materials used for the optical lens, over the frequency ranges of the source, is 0.5% from 100 to 700 GHz.

8. The device according to claim 1, wherein at least one optical component of an optical system has an anti-reflective treatment comprising microstructures in the form of cones or craters.

9. The device according to claim 1, wherein at least one optical system comprises an optical lens and the incoherent source of rays is configured to illuminate the whole of the optical lens closest to said source.

10. The device according to claim 1, wherein the emission frequency of the incoherent source of rays is modulated.

11. The device according to claim 1, wherein the incoherent source of rays comprises a source of thermal-type noise in an IMPATT diode or resistor.

12. The device according to claim 1, which comprises proximity electronics to polarize a nano-transistor comprising the photosensitive area, via a gate voltage close to its swing voltage where the standard operation of the transistor is the most nonlinear.

13. The device according to claim 12, wherein the rectified signal coming from the nano-transistor is amplified by forcing an asymmetry of the loads in the nano-transistor channel through the injection of a current into the nano-transistor channel, between the drain and the source and/or by using metalized motifs acting as antennas.

14. The device according to claim 12, wherein the rectified signal is a continuous potential difference between the Drain and the Source of the nano-transistor measured in common or differential mode.

15. The device according to claim 12, wherein the proximity electronics comprises a compensation circuit to adjust for the offset generated by injecting the current between the drain and the source of the nano-transistor, for example by using a subtractor assembly.

16. The device according to claim 1, wherein the photosensitive area is a nano-transistor, and the signal generated by the THz radiation is a continuous potential difference between the Drain and the Source of the nano-transistor measured in common or differential mode.

17. The device according to claim 16, which comprises proximity electronics to polarize the nano-transistor via a gate voltage close to its swing voltage where the standard operation of the transistor is the most nonlinear.

18. The device according to claim 16, wherein the rectified signal coming from the nano-transistor is amplified by forcing an asymmetry of the loads in the nano-transistor channel through the injection of a current into the transistor channel, between the drain and the source and/or by using metalized motifs acting as antennas.

19. The device according to claim 1, which comprises at least one low-drift low-noise amplifier, which amplifies the signal over the dynamics of an analog-digital converter.

\* \* \* \* \*